(12) United States Patent
Wildman

(10) Patent No.: US 6,595,706 B2
(45) Date of Patent: Jul. 22, 2003

(54) TRANSPORTABLE PROCESSOR

(75) Inventor: Nigel R. Wildman, Watford Hertfordshire (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/014,975

(22) Filed: Dec. 11, 2001

(65) Prior Publication Data

US 2002/0110378 A1 Aug. 15, 2002

(30) Foreign Application Priority Data

Feb. 9, 2001 (GB) ............................................. 0103183

(51) Int. Cl.⁷ ............................ G03D 3/02; G03D 13/00
(52) U.S. Cl. ........................................ 396/626; 396/564
(58) Field of Search ................................. 396/564, 625, 396/626, 628, 630

(56) References Cited

U.S. PATENT DOCUMENTS

| | | | | |
|---|---|---|---|---|
| 4,734,728 A | | 3/1988 | Miller | |
| 4,958,666 A | * | 9/1990 | Kocourek et al. | 141/114 |
| 5,488,447 A | * | 1/1996 | Patton et al. | 222/23 |
| 5,652,936 A | * | 7/1997 | Klees et al. | 396/564 |
| 5,765,071 A | * | 6/1998 | Kinoshita et al. | 396/626 |
| 6,020,948 A | | 2/2000 | Tumidei | |
| 6,062,745 A | * | 5/2000 | Rosenburgh et al. | 355/27 |
| 6,132,114 A | * | 10/2000 | Aso et al. | 396/626 |

FOREIGN PATENT DOCUMENTS

| | | |
|---|---|---|
| EP | 0 738 922 A1 | 4/1986 |
| EP | 0 204 540 | 12/1986 |
| EP | 0 984 324 A1 | 3/2000 |
| EP | 0 992 451 A1 | 4/2000 |
| WO | WO 93/04404 | 3/1993 |

\* cited by examiner

Primary Examiner—Alan A. Mathews
(74) Attorney, Agent, or Firm—Frank Pincelli

(57) ABSTRACT

A processing apparatus is provided which can be easily transported to whatever location is required. The apparatus has no open tanks of processing solution, the possibility of spillage of the solutions being therefore eliminated.

7 Claims, 4 Drawing Sheets

TRANSPORTABLE PROCESSOR

FIELD OF THE INVENTION

This invention relates to the processing of photographic material. The invention particularly relates to a transportable processing unit for processing photographic material.

BACKGROUND OF THE INVENTION

The invention relates to the photographic processing of film and paper in a processing machine, e.g. a minilab. Processing machines are not usually portable. It is desirable to have a processing machine or minilab that is portable. It is also desirable to have a processing machine without the need to empty the chemicals therefrom, or have a hydraulic truck to move it. Such a machine can be used at events where the machine could be quickly set up to process customer films on site. The machine could be transported in van or a truck or even the boot of a car. Such events include big events like the Olympic games or football matches to local fairs and sports events. Other locations could be on passenger ships and trains, for example the Eurostar train. It will be understood that these are examples only and the invention is applicable to any site where the processing of photographic film is wanted.

As stated above, processing machines are not generally transportable. Most machines are large, heavy and contain several liters of chemicals. Attempts have been made to make a portable processor. Some small tabletop machines have been made. These are mostly manual and are certainly not apparently dry in operation. Also, these machines do not demonstrate the film throughput or automated operation suitable for the small minilab market. A small minilab is defined as one that can process between 10–20 rolls of 135–36 film every hour when working at full capacity.

A mobile processor is disclosed in WO93/04404. This document describes a "suitcase processor" which is computer controlled. The processor is in the form of a case-like container. The base of the container includes processing units in which film to be processed is accommodated. The lid of the container houses containers which contain chemicals for processing the film. The chemicals can be fed to the processing units in the base by means of valves operable under control of a computer, also within the case-like container. This processor is portable but cannot handle the capacity of a minilab. In addition there is a strong possibility of leakage of the processing chemicals.

SUMMARY OF THE INVENTION

It is an aim of the invention to provide an easily transportable processing machine in which there are no open tanks containing processing solutions.

According to the present invention there is provided a portable processing apparatus for closed processing photographic material including a processing chamber housed in a transportable unit, the unit being adapted to house a replaceable sealed cartridge containing the processing solutions in individual containers and a sealed waste container, both the cartridge and the waste container being connectable to the processing chamber via fluid tight valve connectors, substantially no processing solution being held in the processing chamber between processing operations.

The machine according to the invention is apparently dry, i.e. there are no open tanks containing processing chemical solutions which may leak. It is also easily transportable and the set up time for processing is short. The processing machine may therefore be placed in a multitude of outlets, or events which may not normally be associated with photo-processing. The owner of the processor can maximize the return on his investment in the processor by being able to place his processor wherever there is a market demand for photographs. The processor is also suitable for environments such as ships and trains where the movement thereof would normally interfere with the quality of processing.

BRIEF DESCRIPTION OF THE DRAWINGS

The invention will now be described, by way of example, with reference to the accompanying drawings, in which.

DETAILED DESCRIPTION OF THE INVENTION

Figure 1:
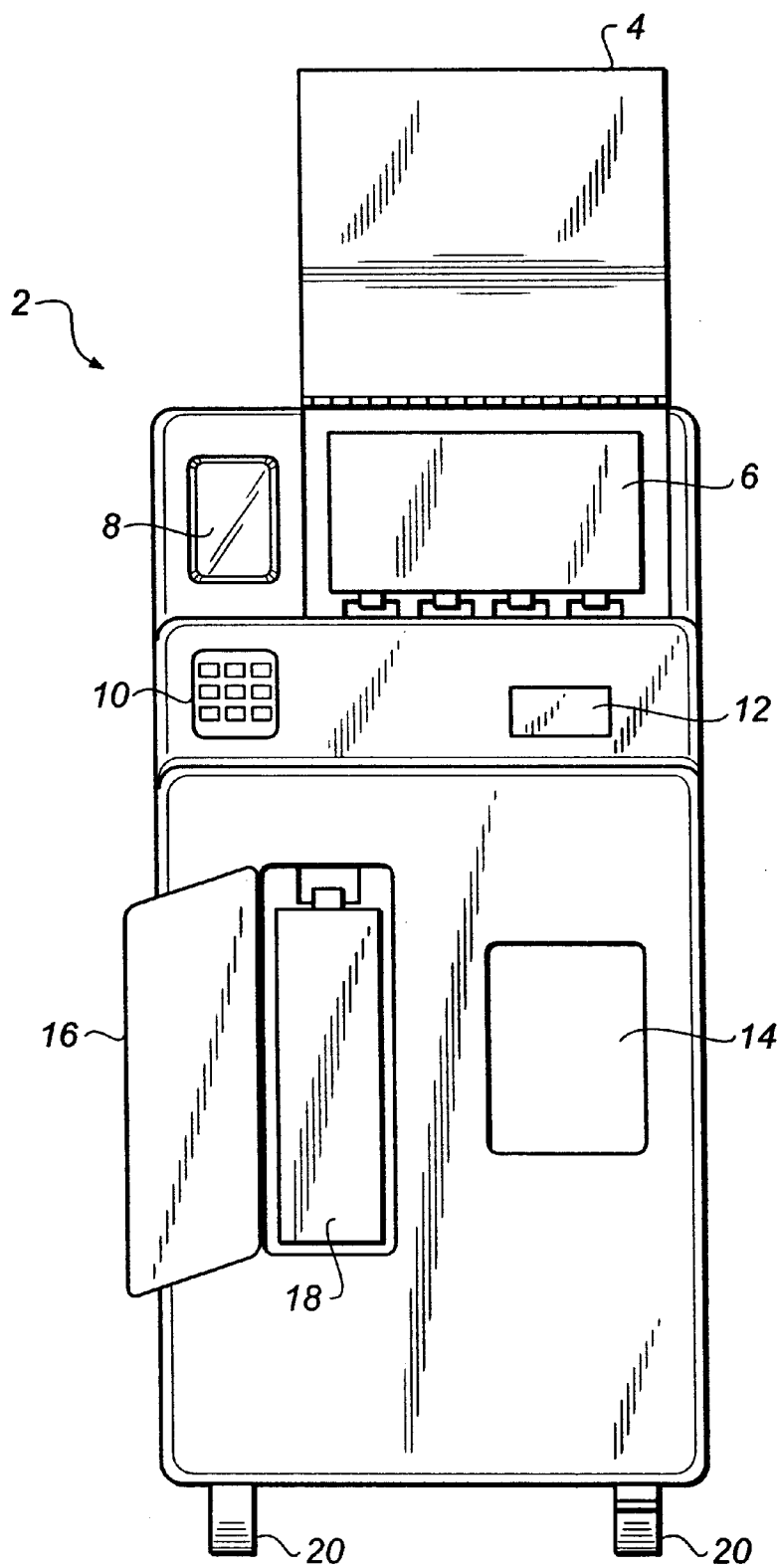
FIG. 1 is a schematic view of an embodiment of the invention.
Figure 2:
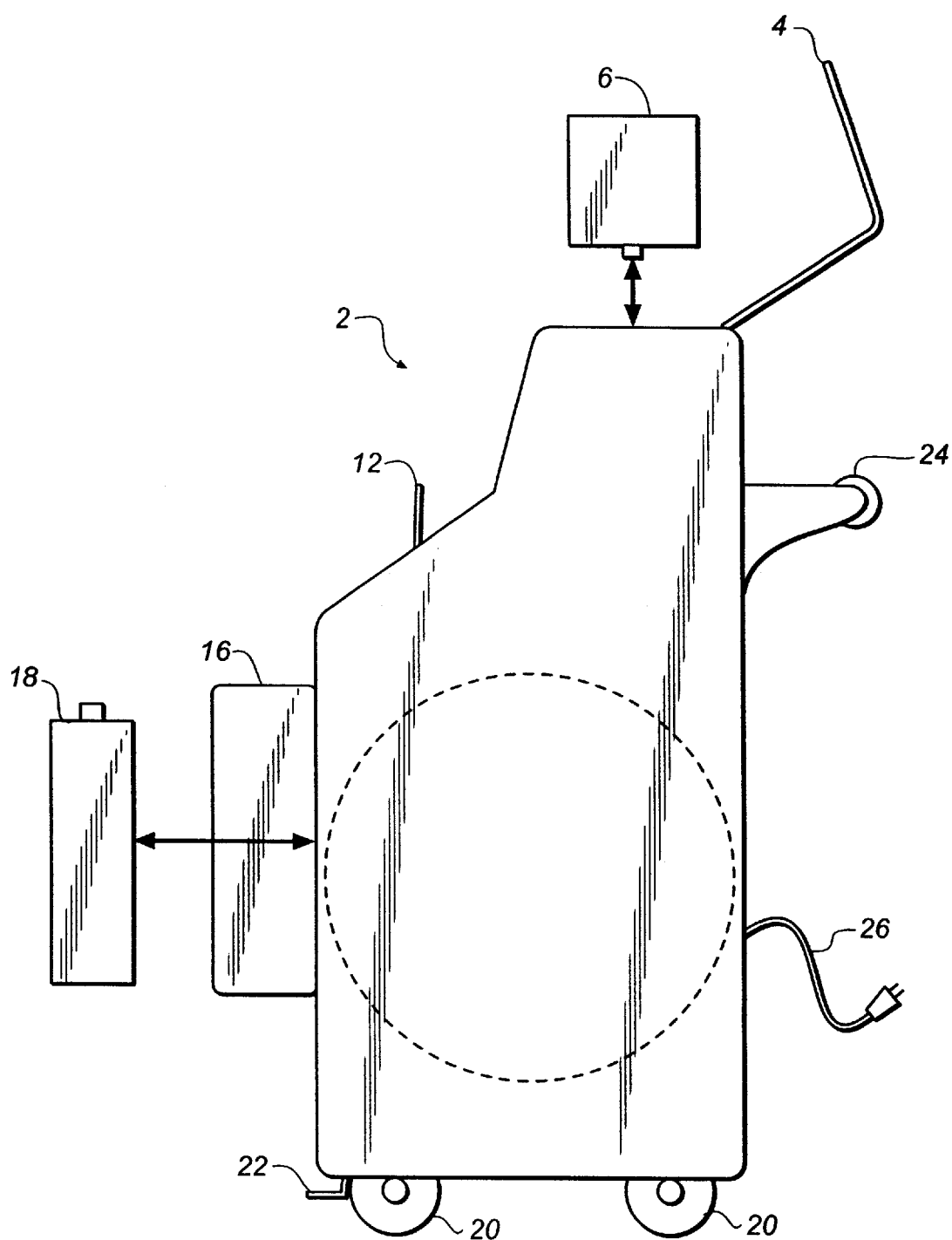
FIG. 2 is a side view of the embodiment shown in FIG. 1.

FIGS. 1 and 2 are schematic views of one embodiment of the invention.

The processor 2 takes the form of a movable unit, as illustrated in the figures. The unit is in the region of one meter high and has a width and depth of approximately 0.5 meters. These measurements are typical only and are not to be taken as limiting the invention in any way.

The front of the unit is provided with an LCD display 8 and keypad 10. An entry door 12 for the film is also provided at the front of the unit. These are provided at a height convenient for the operator.

At the top of the unit there is provided a hinged lid 4 which lifts upwards. Situated beneath the hinged lid 4 is a recess in which a sealed cartridge 6 is located. The cartridge 6 houses the chemical solutions required by the photofinishing process. The cartridge 6 can consist of an assembly of containers for each of the solutions required for the process. A suitable cartridge would be a Kodak Flexicolor SM™ cartridge. The cartridge 6 is easily placed or plugged into the processor. This can be by means of dry break connectors. Such connectors ensure a fluid tight seal between the cartridge and the processing space. Also no processing fluid is wasted due to leakage. A suitable connector is described in EP 0992451. The cartridge is designed to be replaceable. As the cartridge 6 is a sealed unit there is no danger that there will be any spillage of the processing solutions. The use of sealed cartridges and dry break connectors ensures that the operator is not exposed to any of the processing fluid at any point. There is no danger that the operator of the processor will come into contact with any of the chemicals.

In the lower part of the unit 2 there is provided an exit slot 14 for the delivery of the processed articles. A waste collection door 16 is also provided in the lower part of the unit 2. Situated within the unit behind the waste collection door 16 is a waste container 18. The waste container is a sealed unit in which the solutions which have been used in the processor are stored. The waste container is connected to the processor with dry break connectors as described above with respect to the cartridge 6. When the waste container 18 is full it may be removed from the unit 2. As the waste container 18 is a sealed unit there is no danger of any spillage of the used solutions. There is no danger of the operator of the unit coming into contact with the waste solutions.

It is possible for the supply and waste containers to be in an integral package rather than two separate containers. A suitable package could be a bag-in-box arrangement as disclosed in EP 0738922. Processing solution is fed from the bag via a first dry break connector to the processor and used processing solution is returned to the container via a second dry break connector.

The main body of the unit 2 houses a rotatable drum processor, not shown. A suitable drum processor is disclosed in GB 0023091.2, the contents of which are herein incorporated. Such a processor can be adapted to be contained within the portable unit 2. The drum processor disclosed in the reference uses only a small volume of processing solution for each given stage of the process. The small volume of solution is added to the length of material and is spread repeatedly over the entire length thereof. Each stage of the process is done in the same space, each processing solution being added and removed sequentially from the processing space.

The processor has a cylindrical chamber which is rotated during processing. Film is loaded around the inner circumference of the chamber when the chamber is stationary. A metered amount of processing solution is introduced into the chamber and the chamber rotated. The whole volume of the solution is thus spread over the whole area of the film. Any remaining solution is removed from the chamber at the end of each stage and stored in the waste container until such time as it may be removed from the processing unit and safely disposed of. Although the inclusion of a processor as described in GB 0023091.2 is a preferred embodiment for the invention it will be understood that any suitable processing equipment may be used. The important criteria is that the processor does not feature open tanks full of processing solutions.

Processors are usually far too heavy to move without special equipment. The processor of the invention has wheels 20 provided at the base of the unit 2. The wheels give the unit mobility so that is can be wheeled into the position where it is required. At least one of the wheels 20 is provided with braking means 22. The braking means 22 ensure that the processing unit does not move while processing takes place. FIG. 2 shows a handle 24 provided on the back wall of the unit to facilitate movement. It is of course possible to provide the handle on any suitable surface of the unit.

Wheels are the preferred mode of transport of the unit. However it will be obvious that any suitable transport means may be used, for example, it would be possible to use an air cushion or such like.

A power lead 26 extends from the rear of the unit 2. It is possible however for the processor to use battery power should this be necessary.

It will be understood that the processing unit will house other devices, such as a motor for rotation of the drum, heaters, pumps, fans, a CPU, etc. For simplicity, only those features which are essential for an understanding of the invention are specifically mentioned and described.

The unit may be located and set up wherever it is required. The processing unit is provided with power and allowed to warm up. Processing may then take place. The power supply may be from a mains supply if the processor is located indoors or may be from a generator should the processor be located outdoors.

After the film is processed the processor may be powered down and immediately transported. Thus the processor only needs to be stationary for the processing of the film. If the motion of the processor is relatively constant, such as on a train or a ship, then the film may be processed while the processor is moving. Once the photographic material has been processed the solution used goes into the waste container. Therefore when the material is not being processed the processing chamber is essentially empty. The portable processor can therefore be shaken or tipped or rolled on wheels without risk of liquid spill.

Figure 3:
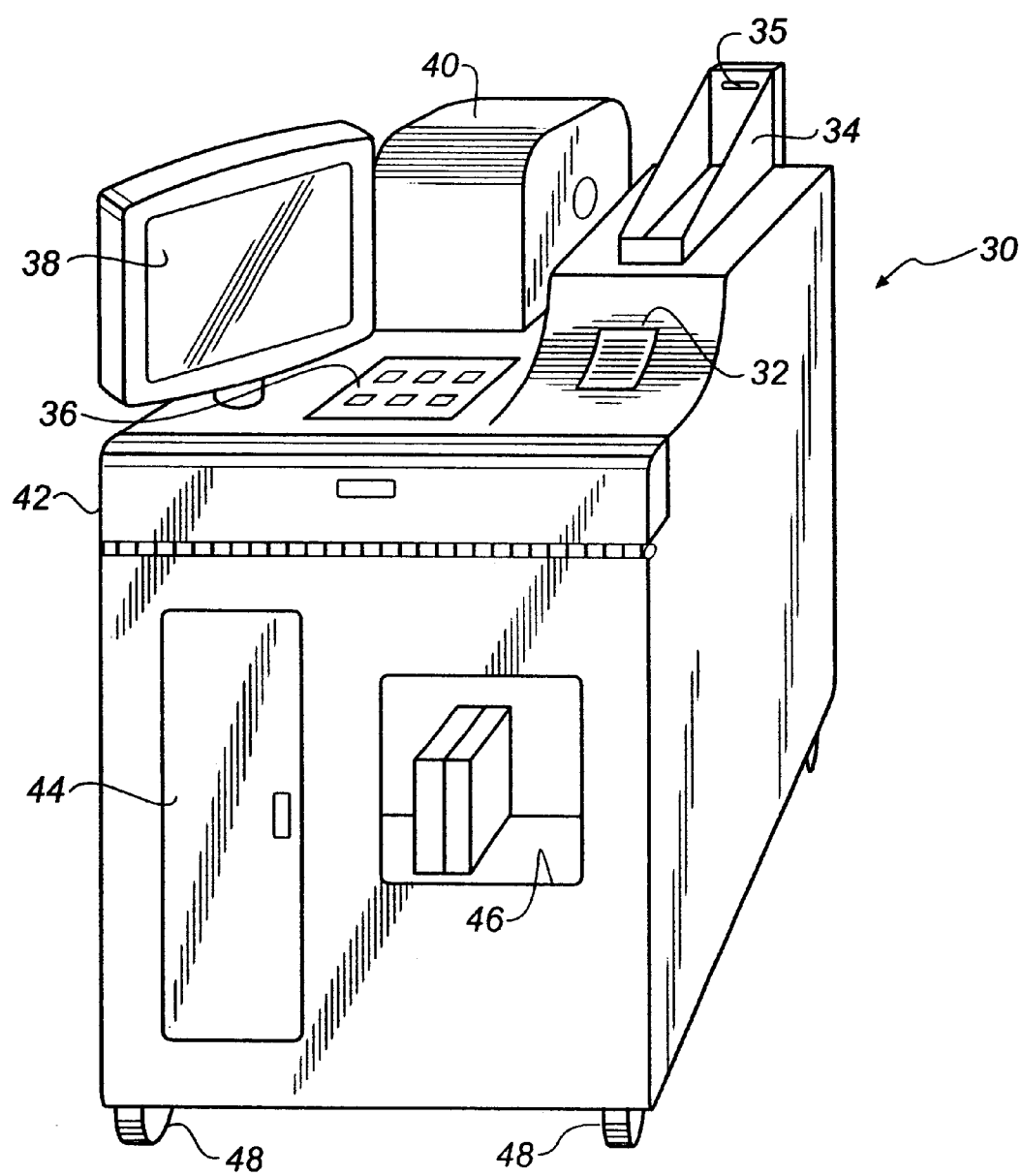
FIG. 3 is a schematic view of a second embodiment of the invention.

FIG. 3 is a schematic view of a second embodiment of the invention. This embodiment includes a printer processor within the portable unit.

The unit 30 comprises both a film and paper processor and is in the region of one meter high and has a width of approximately 0.7 meters and a depth of approximately one meter. These measurements are typical only and are not to be taken as limiting the invention.

The top of the unit 30 is provided with a film entry door 32 for the film to be entered into the unit. Behind the film entry door 32 is a film exit container 34 including a film exit slot 35. A keypad 36 is provided towards the front of the top of the unit 30. A VDU 38 is located behind the keypad 36. A paper cassette 40 for holding the paper is provided towards the back of the unit 30. A hinged flap 42 is provided at the front of the unit 30. A chemical cartridge as described above may be inserted through the flap 42 for connection with the processor.

The lower part of the unit 30 is provided with a waste collection door 44 for the removal of waste solution as described above. A print delivery door 46 may also be located at the front of the lower part of the unit 30.

As described above, the unit 30 houses a rotatable drum processor. In this embodiment the unit 30 also houses a scanner and a paper processor. The paper processor may, for example, be a surface application processor, a spray application processor or an ink jet printer. A surface application processor is disclosed in pending EP application no. 00204540.9. A spray application processor is disclosed in EP 0984324A1. These are examples only of suitable processors. Any paper processor which does not have open tanks of solution may be incorporated within the unit 30.

The base of the unit 30 is provided with wheels 48. A handle, not shown, is also provided on the back wall of the unit to facilitate movement.

When exposed film is brought to the unit 30 the operator inserts the film into the film entry door 32. The film is processed as described in relation the embodiment shown in FIG. 1. However, in unit 30 the film is scanned prior to exiting the unit from film exit slot 35. The scanned images may be seen on VDU 38. The operator uses the keypad 36 to determine the software to be used for processing the film and also to manipulate the scanned images seen on the VDU 38. The process is as known in any conventional combined film and paper processor, e.g. a Gretag™ minilab.

It will be understood that the film and paper processor as described is an example only. The important features are that both the film and paper processors do not have open tanks. The configuration of the parts of the unit described should not be taken as limiting the invention in any way.

It will be understood that it is not essential for one portable unit to accommodate both the processor and the printer. It is possible to have them in separate portable units.

Figure 4:
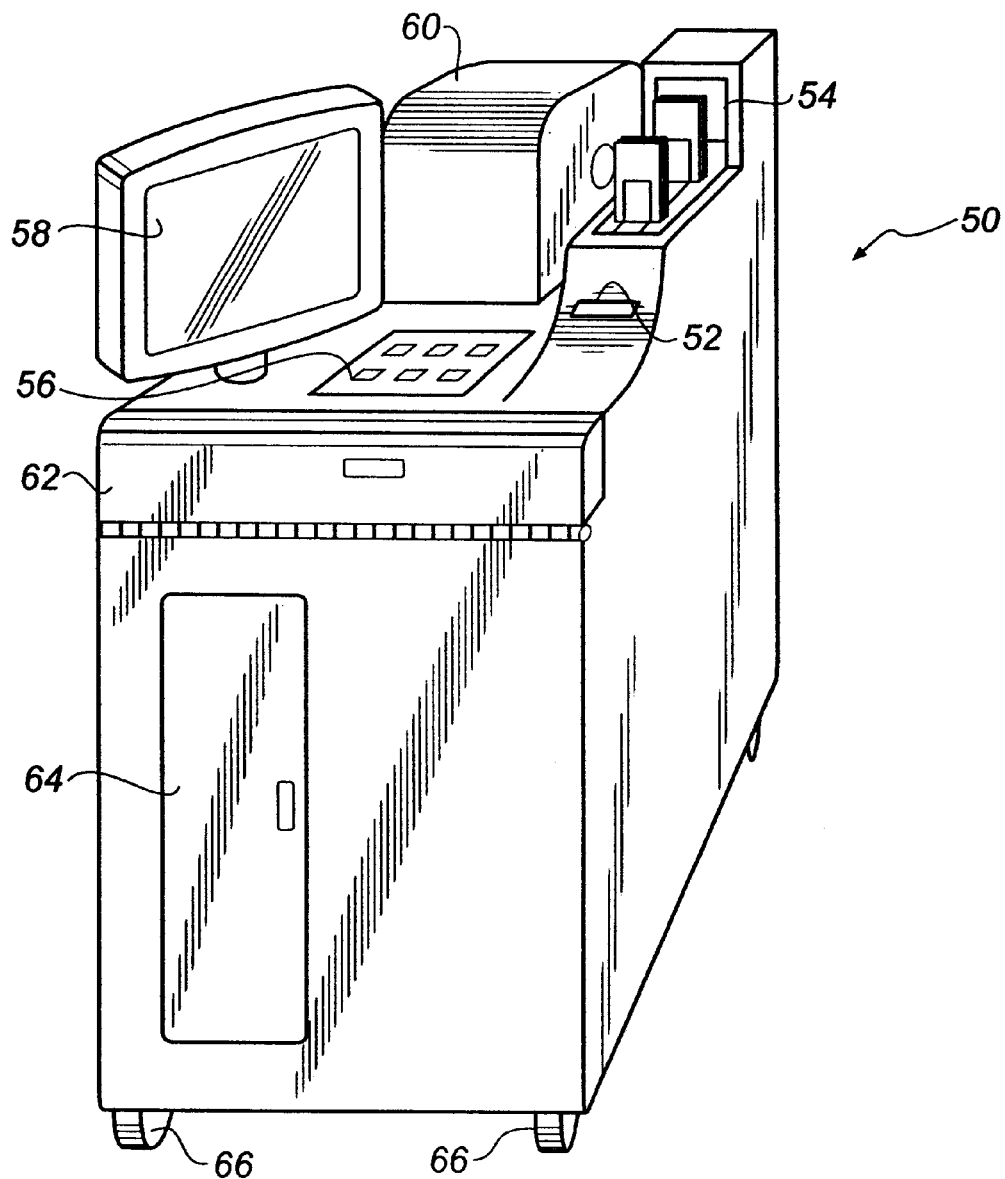
FIG. 4 is a schematic view of a third embodiment of the invention.

FIG. 4 is a schematic view of a separate portable paper processor that may be used in combination with a portable processor as described with reference to FIGS. 1 and 2.

The paper processor unit 50 is in the region of one meter high, has a width of approximately 0.5 m and a depth of approximately one meter. These measurements are typical only.

The top of the unit 50 is provided with a film entry door 52 for processed film to be entered into the unit. Behind the film entry door 52 is a print delivery exit 54, for example a conveyor. A keypad 56 is provided towards the front of the top of the unit 50. A VDU 58 is located behind the keypad 56. A paper cassette 60 for holding the paper is provided towards the back of the unit 50. A hinged flap 62 is provided at the front of the unit 50. A chemical cartridge as described above may be inserted through the flap 62 for connection with the processor.

The lower part of the unit 50 is provided with a waste collection door 64 for the removal of waste solution as described above.

In this embodiment the unit 50 houses a scanner and a paper processor. The paper processor may be any suitable processor, as described above.

The base of the unit 50 is provided with wheels 66 A handle, not shown, is also provided on the back wall of the unit to facilitate movement.

It will be understood by those skilled in the art that the above described processors are examples only of the invention. The essential features of the invention are that the processor is transportable and that the processor is an "apparently dry" processor, i.e. there are no open tanks full of processing solutions.

The invention has been described in detail with reference to preferred embodiments thereof. It will be understood by those skilled in the art that variations and modifications can be effected within the scope of the invention.

Parts List

2 Processor unit
4 lid
6 cartridge
8 LCD display
10 keypad
12 door
14 exit slot
16 door
18 container
20 wheel
22 braking means
24 handle
26 power lead
30 unit
32 door
34 container
35 exit slot
36 keypad
38 VDU
40 cassette
42 flap
44 door
46 door
48 wheel
50 unit
52 door
54 exit
56 keypad
58 VDU
60 paper cassette
62 flap
64 door
66 wheel

What is claimed is:

1. A portable processing apparatus for processing photographic material including a closed processing chamber housed in a transportable unit, the unit being adapted to house a replaceable sealed cartridge containing the processing solutions in individual containers and a sealed waste container, both the cartridge and the waste container being connectable to the processing chamber via fluid tight valve connectors, substantially no processing solution being held in the processing chamber between processing operations.

2. An apparatus as claimed in claim 1, the unit further housing a printer processor.

3. An apparatus as claimed in claim 2, the unit further housing a scanner.

4. An apparatus as claimed in claim 1 wherein the replaceable cartridge and waste containers are provided as one package.

5. An apparatus as claimed in claim 1 further including means for connection with an external power supply.

6. An apparatus as claimed in claim 1 wherein the transportable unit is provided with wheels on the underside thereof.

7. An apparatus as claimed in claim 1 with a capacity to develop up to 20 rolls of 135–36 film per hour.

* * * * *